No. 883,094. PATENTED MAR. 24, 1908.
R. R. DEBACHER.
FRAME FOR MIRRORS, BRUSHES, PICTURES, AND THE LIKE.
APPLICATION FILED SEPT. 10, 1907.
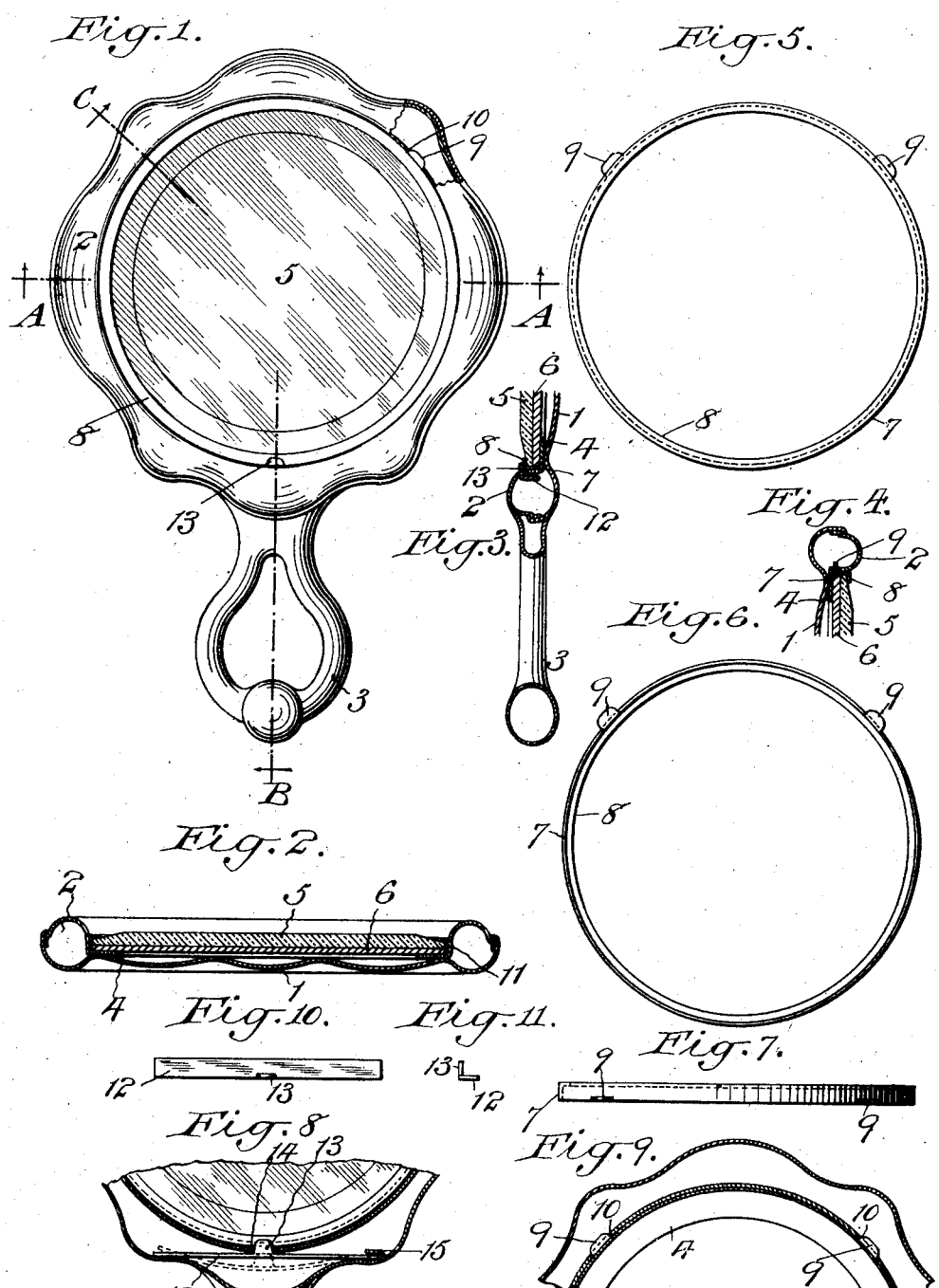

ROBERT R. DEBACHER, OF HOBOKEN, NEW JERSEY.

FRAME FOR MIRRORS, BRUSHES, PICTURES, AND THE LIKE.

No. 883,094.

Specification of Letters Patent.

Patented March 24, 1908.

Application filed September 10, 1907. Serial No. 392,099.

*To all whom it may concern:*

Be it known that I, ROBERT R. DEBACHER, a citizen of the United States, and resident of Hoboken, in the county of Hudson and State of New Jersey, have invented a new and useful Improvement in Frames for Mirrors, Brushes, Pictures, and the Like, of which the following is a specification.

The object of this invention is to provide means for removably securing an article, such, for instance, as a mirror, a brush or a picture, within its frame so that the article may be very quickly removed from its frame or inserted into position therein.

A practical embodiment of my invention is represented in the accompanying drawings in which Figure 1 represents a mirror and its frame in front elevation, a portion of the frame being broken away to more clearly show the parts within the same. Fig. 2 is a transverse section taken in the plane of the line A—A of Fig. 1, looking in the direction of the arrows. Fig. 3 is a detail section taken in the plane of the line B of Fig. 1, looking in the direction of the arrow. Fig. 4 is a detail section taken in the plane of the line C of Fig. 1, looking in the direction of the arrow. Fig. 5 is a front view of the article retaining ring. Fig. 6 is a back view of the same. Fig. 7 is an edge view of the said ring. Fig. 8 is a detail section showing the manner of mounting the spring catch within the frame. Fig. 9 is a detail section showing the manner of engagement of the lugs on the retaining ring with the frame, and Figs. 10 and 11 are detail plan and end views respectively of the spring catch.

The frame herein shown comprises a back 1, a hollow encircling portion 2 and a suitable hollow handle 3, which frame may be of any desired form and size. A flange 4 of the frame forms a seat for the mirror or other article in connection with which the frame is used. In the present instance the article shown in connection with the frame is a mirror 5 having a suitable back plate 6.

The retaining ring for the mirror is denoted by 7 and it is provided with an inwardly extended flange 8 arranged to overlap the front of the mirror adjacent to its periphery. This retaining ring is provided with lugs 9 arranged to enter slits 10 in the adjacent wall 11 of the frame 2. This ring 7 fits snugly within the wall 11 of the frame and is removably secured within the frame as follows. A spring catch comprises a strip 12 of spring metal having a lug 13 uprising therefrom, which lug extends through a slit 14 in the wall 11 of the frame in position to overlap the flange 8 of the retaining ring when the spring catch is in its normal position. This spring catch is held within the encircling portion 2 of the frame without the use of solder or other cement as follows. One end of the strip 12 of the catch is seated within a recess formed by stamping a tongue 15 from the frame and bending the tongue inwardly over the end of the said strip. The other end of the strip rests against the inner face of the outer wall of the encircling portion of the frame, thus leaving the intermediate portion of the strip free to be sprung a sufficient distance to permit the lug 13 of the catch to be forced beyond the periphery of the retaining ring 7, when it is desired to insert or remove the retaining ring and the article which it holds. It will thus be seen that the article is removably secured within the frame by the engagement of the lugs 9 of the ring with the frame and the engagement of the spring catch carried by the frame, with the retaining ring.

While I have shown this invention as applied to a mirror, it is to be understood that it may be equally well applied to other articles, such as brushes, pictures, etc. which require a frame.

What I claim is:

1. An article, a retaining ring surrounding the same, a frame, means for removably securing the ring within the frame comprising a lug and slit connection between the ring and frame, and a spring catch in the frame arranged to engage the ring.

2. An article, a retaining ring surrounding the same, a frame, means for removably securing the ring within the frame comprising lugs on the ring entering slits in the frame, and a spring catch in the frame having a lug arranged to normally overlap the periphery of the ring.

3. An article, a retaining ring surrounding the same, lugs on the ring entering slits in the frame, a spring catch comprising a flat strip and a lug normally overlapping the periphery of the ring, and a tongue struck from the frame for holding the spring catch in position therein.

In testimony, that I claim the foregoing as my invention, I have signed my name in presence of two witnesses, this twenty-ninth day of August 1907.

ROBERT R. DEBACHER.

Witnesses:
E. D. WHITMORE,
H. BEHRENS.